United States Patent [19]

Gorlin et al.

[11] 4,180,752
[45] Dec. 25, 1979

[54] MAGNETOHYDRODYNAMIC DEVICE

[75] Inventors: Samuil M. Gorlin; Grigory A. Ljubimov; Valentin A. Bitjurin; Valentin I. Kovbasjuk; Vladilen I. Maximenko; Stanislav A. Medin; Alexandr E. Barshak, all of Moscow, U.S.S.R.

[73] Assignee: Institut Vysokikh Temperatur Akademii Nauk S.S.S.R, Moscow

[21] Appl. No.: 865,340

[22] Filed: Dec. 28, 1977

[30] Foreign Application Priority Data

Dec. 29, 1976 [SU] U.S.S.R. .................. 2435698

[51] Int. Cl.$^2$ .............................. H02N 4/02
[52] U.S. Cl. ................................... 310/11
[58] Field of Search ........................ 310/11

[56] References Cited

U.S. PATENT DOCUMENTS

| 3,387,150 | 6/1968 | Powers et al. ............... 310/11 |
| 3,465,179 | 9/1969 | Ricateau ..................... 310/11 |

*Primary Examiner*—Donovan F. Duggan
*Attorney, Agent, or Firm*—Haseltine, Lake & Waters

[57] ABSTRACT

A magnetohydrodynamic device having a duct for a conducting gas to flow at an angle with the direction of the magnetic field induction vector. The duct is situated in the magnetic system and is provided with a plurality of electrodes adapted to interact electrically with the gas, whereas the cross-sectional shape of the duct working space is bounded by a closed contour formed by a curve inscribed into a rectangle having its sides $a \geq b$, while the minimum radius R of curvature of said curve is related to the distance x from the entry to the duct for the conducting gas to flow, to the cross-section under consideration by the following formula:

$$\frac{a}{2} > R \geq 5(10^{-2} \text{ to } 10^{-4}) \cdot \left[ 1 + \frac{P_o}{4S_o} x \right]^\alpha \frac{4S_o}{P_o},$$

where $P_o$ and $S_o$ stand, respectively, for the perimeter and cross-sectional area of the duct 1 at the entry thereof, and $0.5 \leq \alpha \leq 1$.

1 Claim, 2 Drawing Figures

MAGNETOHYDRODYNAMIC DEVICE

FIELD OF THE INVENTION

The present invention relates generally to a magnetohydrodynamic (MHD) method of energy conversion and has particular reference to MHD devices, viz., generators and accelerators, mostly of the linear type.

BACKGROUND OF THE INVENTION

Known in the art are MHD devices, comprising a duct for a conducting gas to flow at an angle with the direction of magnetic field induction vector, said duct being situated in the magnetic system. The duct is provided with a plurality of electrodes electrically interacting with the above gas. The working space of the duct is cross-sectionally bounded by a closed convex surface. The cross-sectional shape of the duct working space exerts substantial influence upon the output characteristics of the MHD device.

Thus, ducts having a circular cross sectional shape are known for use in MHD generators of the Faraday and frame type generators. Such ducts feature practically minimized hydraulic losses. From the viewpoint of utilization of the magnetic field volume, circular ducts are used optimally with cylindrical-shaped superconducting magnetic systems. However, combination of circular ducts with rectangular magnetic systems, such as those with an iron core, proves to be ineffective due to an incomplete utilization of the magnetic field volume.

Another type of duct is known to have its working space bounded by a rectangular contour. Such a duct has been used, in particular, in the frame-type MHD generator (cf., e.g., U.S. Pat. No. 3,387,150 dated 1968).

Ducts with rectangular cross-sectional shape of the working space provide for maximum utilization of the magnetic field volume in magnetic systems incorporating an iron core with a rectangular magnet gap.

However, rectangular-shape ducts feature an increased turbulence of the flow of gas occurring at the corners thereof within the region of the order of a local thickness of the boundary layer, which results, firstly, in unfavorable temperature distribution near the duct walls and, secondly, in increased thermohydraulic losses. Altered temperature distribution at the duct corners leads to a badly affected distribution of the conductivity of the gas working fluid, whereby a great proportion of the working current passes to the corner zones, whereas current distribution over the electrode towards the outer magnetic field becomes substantially nonuniform. In its turn, non-uniform current distribution increases the likelihood for the electrode to change over from a favorable diffusion mode of operation to an arc-shaped one, which increases by several orders of magnitude an erosion wear on the surfaces of the MHD-generator duct which in turn reduces the service life of the latter to an inadmissibly low value.

SUMMARY OF THE INVENTION

It is an object of the present invention to provide improvements in electrodynamic and gasdynamic characteristics of a rectangular duct of the MHD device.

It is another object of the present invention to provide an increased operational reliability and prolonged service life of the MHD-device duct.

These objects are accomplished due to the fact that in a magnetohydrodynamic device, having a duct for a conducting gas to flow at an angle with the direction of the magnetic field induction vector, the duct being situated in the magnetic system, having its bounded by a closed convex contour and being provided with a plurality of electrodes adapted to interact electrically with the gas, according to the invention the closed-contour is established by a curve inscribed into a rectangle with sides $a \geq b$, while a minimum radius R of curvature of the curve is related to a distance 'x' from the entry to the duct for a conducting gas to flow, to the cross-section under consideration by the following formula:

$$\frac{a}{2} > R \geq 5\,(10^{-2}\ \text{to}\ 10^{-4}) \cdot \left[1 + \frac{P_o}{4S_o} x\right]^{\alpha} \cdot \frac{4S_o}{P_o},$$

where $P_o$ and $S_o$ stand, respectively, for the perimeter and cross-sectional area of the duct at the entry thereof, and $0.5 \leq \alpha \leq 1$.

An MHD device incorporating the duct, where the cross-sectional shape of the working space thereof is selected according to the present invention, is characterized by higher electrodynamic and gas dynamic characteristics, as well as by increased operational reliability and longer service life.

BRIEF DESCRIPTION OF THE DRAWINGS

The present invention is illustrated in a detailed description of a specific embodiment thereof to be taken with reference to the accompanying drawings.

DESCRIPTION OF THE PREFERRED EMBODIMENTS

Now referring to the accompanying drawings, the present invention will hereinafter be disclosed with reference to an MHD generator having a linear duct 1 (FIGS. 1 and 2) bounded by walls.

Figure 1:
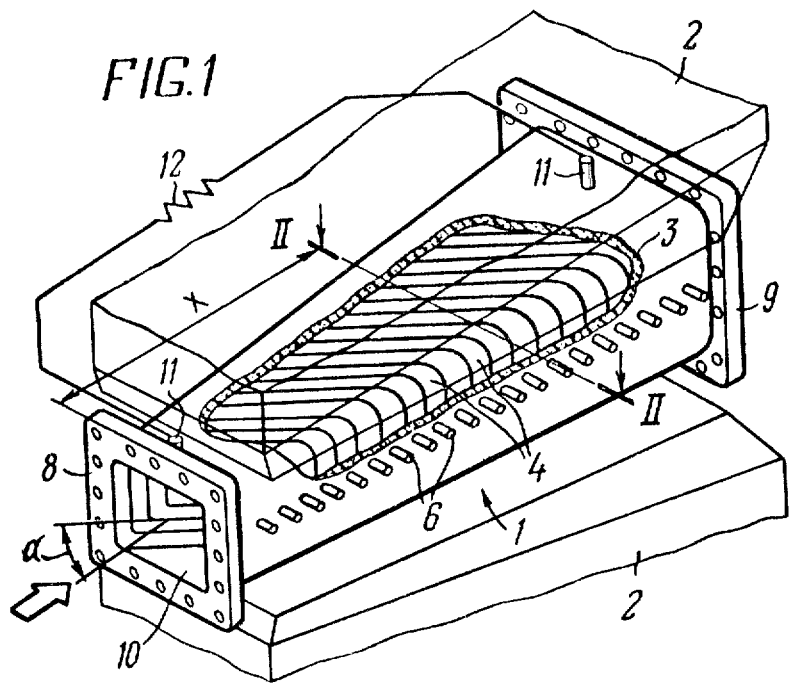
FIG. 1 is an isometric view of a MHD device, according to the invention.
Figure 2:
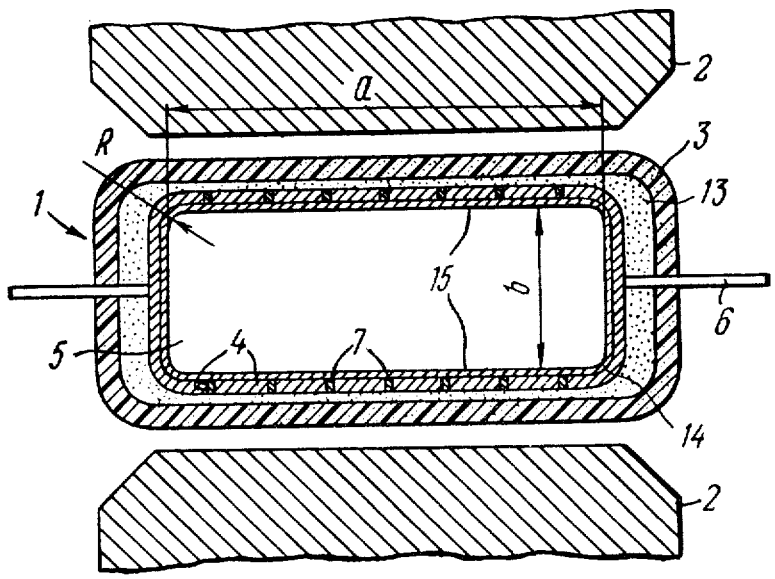
FIG. 2 is a section taken along the line II—II in FIG. 1.

The duct 1 is adapted for the high-velocity flow of a non-conducting gas to pass through a transverse magnetic field established by the magnetic system of the generator, only poles 2 of said system being indicated with thin lines FIGS. 1 and 2. The duct 1 is essentially a housing 3 made of glass-fabric reinforced plastic and accommodating frames 4 which with their inner contours bound a working space 5 of the duct 1, wherein an e.m.f is induced as a result of the gas flow in the transverse magnetic field; these said frames provide for current withdrawal from the working space 5 of the duct 1, i.e., they perform the function of electrodes. The frames 4 are made from a good electric conductor, e.g., copper, and can be provided with inner holes for passing a coolant, such as water. The coolant is fed to the frames 4 and withdrawn therefrom through sleeves 6. The frames 4 are held to the housing 3 at a certain substantially variable angle $\alpha$ with the longitudinal axis of the duct 1, the magnitude of the angle $\alpha$ depending upon the rated performance of the MHD generator and the parameters of the gas flow. For typical representative performance characteristics of the MHD generator whose working substance is in fact the combustion product of a mineral fuel burned in the air with an additive of an alkaline metal (K, Cs, etc.), the optimum magnitudes of the angle $\alpha$ made up by the frames 4 with the axis of the duct 1 lie within the range from 20 to 60°. The loops 4 are insulated from one another by means of an insulator 7 to provide capacity use may be made of high-temperature dense ceramics.

The duct 1 is provided with respective flanges 8 and 9 situated at the entry and exit thereof, through which the duct is mechanically connected with the adjacent elements of the MHD-generator circuit, viz., the nozzle at the entry and the diffuser at the exit (both being not shown in FIG. 1). Located in the entry and exit portions of the duct 1 are transitional current-collecting elements 10 adapted to define an electrical connection between the regular sectionalized portion of the duct 1 formed by the frames 4 and the adjacent elements of the MHD-generator circuit, i.e., the nozzle and the diffuser. The elements 10 are provided with current leadouts 11 to which a principal electric load 12 is connected. The sleeves 6 of the frames 4 may also serve as current leadouts for connecting an electric load (not shown in FIGS. 1 and 2) immediately to the frames 4. The space confined within the housing 3 and the frames 4 is filled with a heat-resistant sealant 13 (purposely not shown in FIG. 1), featuring good insulating properties, such as thermocement. The inner surface of the frames 4 are coated with a high-temperature conducting material 14 (not shown purposely in FIG. 1) which provides for current flowing from the working space 5 to the frames 4 and the transitional elements 10. The inner surface of the frames 4 coated with the material 14, bounds the working space 5 and defines the cross-sectional shape of the working space 5 of the duct 1. The cross-sectional contour of the working space 5 of the duct 1 is in effect a convex closed curve 15 inscribed into a rectangle having its sides a and b ($a \geq b$). A minimum radius R of curvature of the curve 15 (in the given particular embodiment of the invention the radius of a circle arc inscribed into the right angle) is related to a distance 'x' from the entry cross-section of the duct 1 to the cross-section under consideration by the following formula:

$$\frac{a}{2} > R \geq 5 \cdot (10^{-2} \text{ to } 10^{-4}) \cdot \left[1 + \frac{P_o}{4S_o} x\right]^\alpha \frac{4S_o}{P_o},$$

where $P_o$ and $S_o$ stand, respectively, for the perimeter and cross-sectional area of the duct 1 at the entry thereof, and $0.5 \leq \alpha \leq 1$. The entry cross-section of the duct 1 implies the outer (with respect to the duct 1) surface of the inlet flange 8.

The device operates as follows.

The working substance (such as the gaseous combustion products) is prepared in the combustion chamber, then accelerated in the nozzle (both not shown in FIGS. 1 and 2) to a velocity on the order of a few thousand meters per second and is directed through the inlet flange 8 to the duct 1. Then the excitation coils (not shown in FIGS. 1 and 2) of the magnetic system are energized, with the result that a magnetic field is established between the poles 2 of the magnetic system, the induction vector of said field being normal to the direction of the gas flow. As the gas flows in the magnetic field, an e.m.f. is induced which establishes current in the circuit of the load 12 upon connecting the latter.

The cross-sectional shape of the working space 5 of the duct 1 made according to the invention, rules out increased turbulence of the gas layer at the walls of the duct 1 which is liable to arise usually due to the presence of corner points (or items similar to these in the order of the local thickness of the boundary layer) on the cross-sectional contour of the working space 5 of the duct 1.

As a result, the distribution of the flow parameters close to the walls of the duct 1 approximates those characteristic in the case of the flow-around of a flat plate, which provides for a more uniform distribution of the normal component of the current fed from the working space 5 to the inner surface of the duct 1, as compared to the case of the cross-sectional contour of the working space 5 featuring corner (or similar) points, thus rendering less probable the onset of electric-arc break-downs. In addition, it is due to a favorable distribution of parameters, i.e., avoiding a wide inhomogeneity in the corner zones of the working space, that the output characteristics of the MHD generator, viz., an absolute and specific power, are improved, while the thermohydraulic losses in the duct 1 are reduced. Inasmuch as the thickness of the boundary layer rises along the length of the duct 1, the minimum radius R of curvature of the cross-sectional contour of the working space 5 of the duct 1 increases accordingly in full concordance with the relation stated hereinbefore.

In the case where the duct 1 of the MHD generator whose working space 5 has a cross-sectional contour is essentially a square with the sides 'a' with the corners rounded along circle arcs with the radius $R = a/8$ and the thickness $\delta$ of the boundary layer equal to R, the flow parameters being as follows: velocity of the flow core, 2500 m/s, static pressure, 0.1 MPa, conductivity of the flow core, ca. 18 mho/m, temperature of the flow core, 2650K, temperature of the duct walls $T_w = 2000K$, Hall parameter $\beta = 3$, magnetic field induction $B = 4T$, and a distribution of the flow parameters of the boundary layer taken in accordance with the degree dependance for a longitudinal velocity and total enthalpy ("Law 1/7"), the gain in power equals 7 percent in terms of specific power and 5 percent in terms of absolute power, as compared to the case of a square cross-sectional shape of the duct working space with the same flow parameters.

Proceeding from the principle of reversibility of electrical machines all the above-stated with respect to MHD generators may refer to other MHD devices, such as MHD accelerators and MHD pumps.

What is claimed is:

1. A magnetohydrodynamic device, comprising: a magnetic system; a duct located in said magnetic system and adapted for a conducting gas to flow at an angle with the direction of the induction vector of said magnetic field; a plurality of electrodes electrically interacting with said gas; a cross-sectional shape of the working space of said duct bounded by a convex curve inscribed into a rectangle with its sides $a \leq b$; a minimum radius R of curvature of said curve being related to a distance 'x' from entry of said duct to the cross-section under consideration by the following formula:

$$\frac{a}{2} > R \geq 5 (10^{-2} \text{ to } 10^{-4}) \cdot \left[1 + \frac{P_o}{4S_o} x\right]^\alpha \frac{4S_o}{P_o},$$

where $P_o$ and $S_o$ stand, respectively, for the perimeter and cross-sectional area of the duct at the entry thereof and $0.5 \leq \alpha \leq 1$.

* * * * *